March 17, 1964 E. L. ADAMS 3,124,839
APPARATUS FOR PRODUCING EXTRUDED TUBING
OF THERMOPLASTIC MATERIAL
Filed Oct. 23, 1961 2 Sheets-Sheet 1
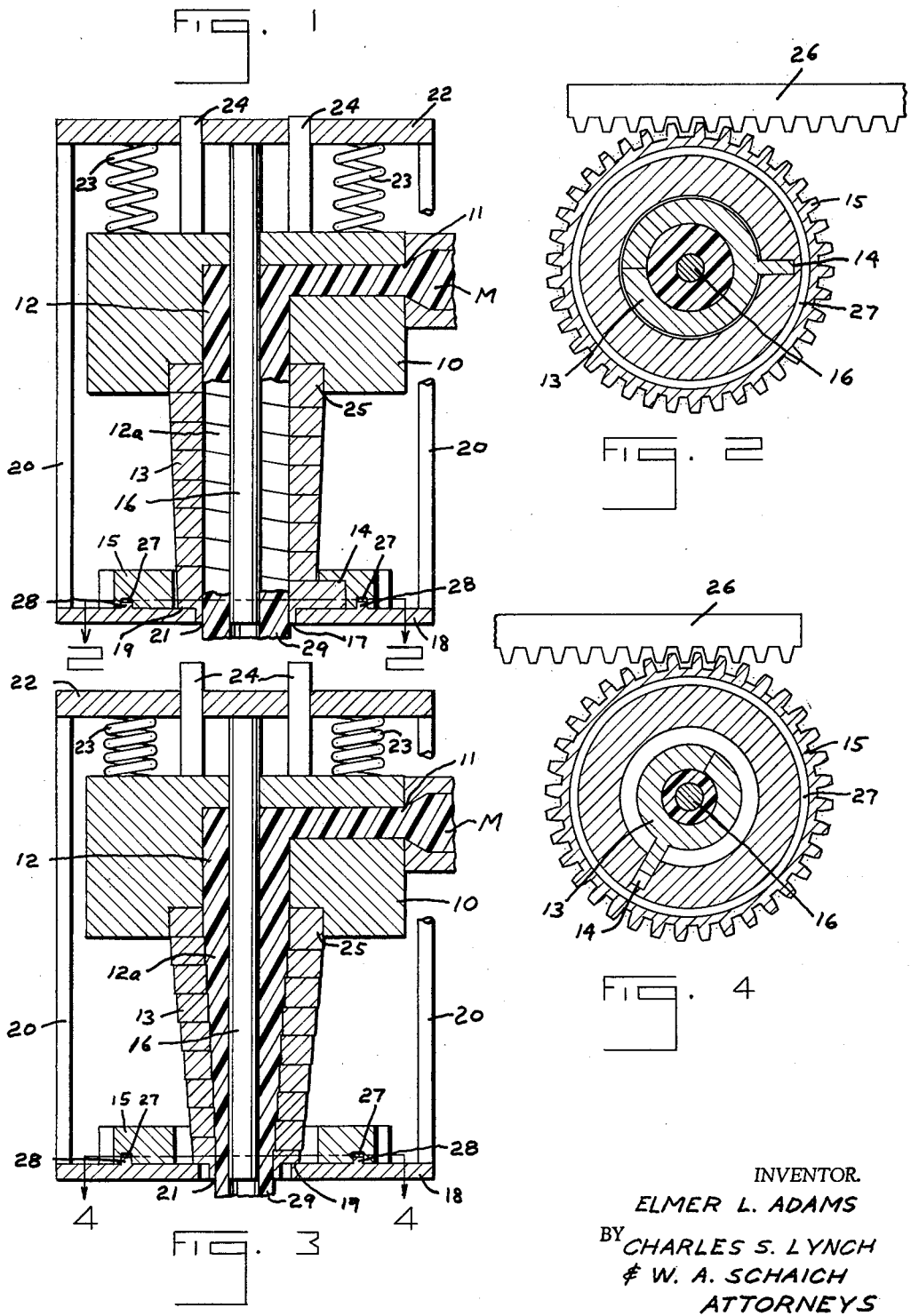
INVENTOR.
ELMER L. ADAMS
BY CHARLES S. LYNCH
& W. A. SCHAICH
ATTORNEYS

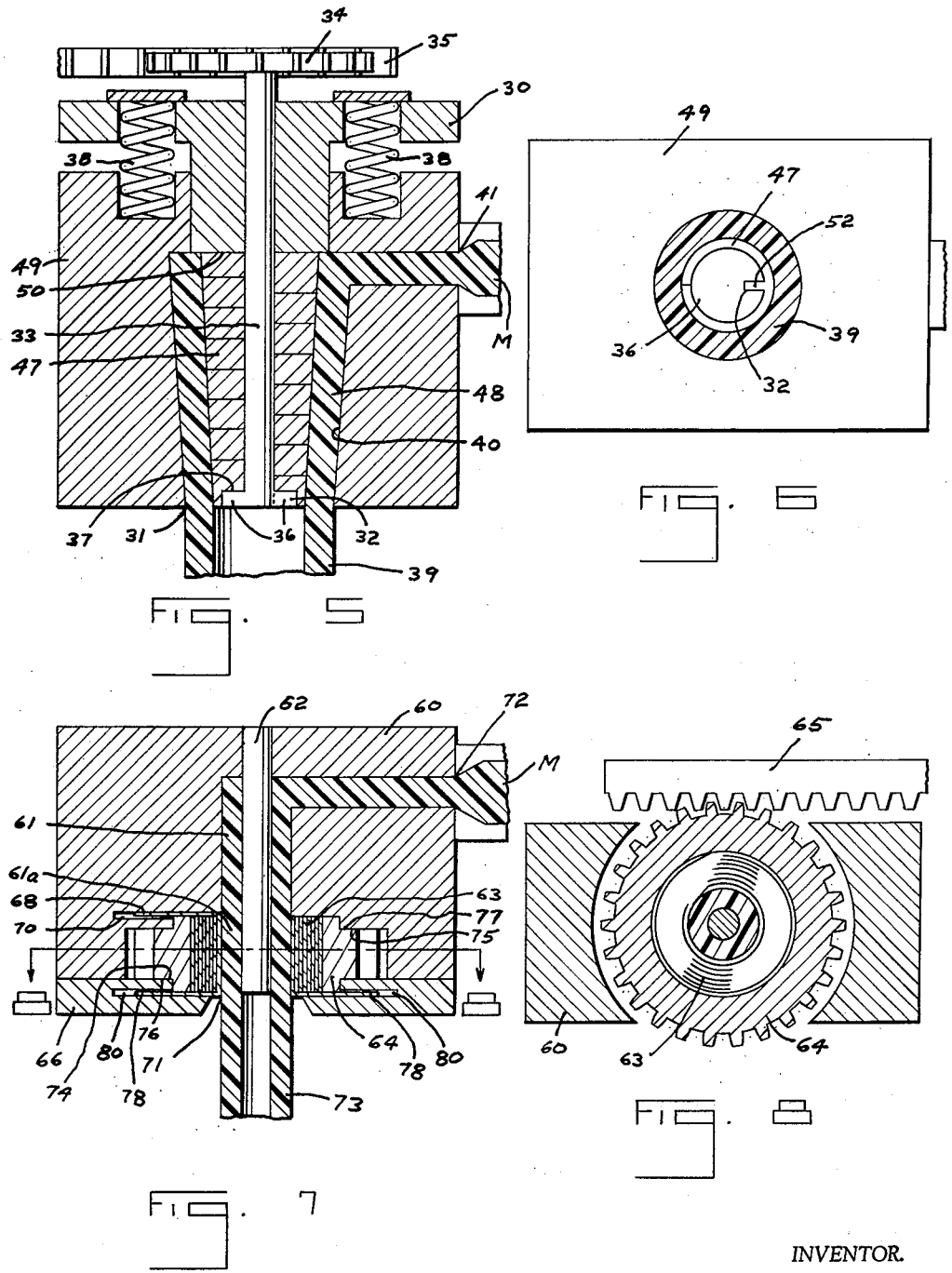

United States Patent Office 3,124,839
Patented Mar. 17, 1964

3,124,839
APPARATUS FOR PRODUCING EXTRUDED TUBING OF THERMOPLASTIC MATERIAL
Elmer L. Adams, Toledo, Ohio, assignor to Owens-Illinois Glass Company, a corporation of Ohio
Filed Oct. 23, 1961, Ser. No. 146,951
15 Claims. (Cl. 18—14)

This invention relates in general to the art of extruding thermoplastic tubing and more particularly to extruding tubular parisons of thermoplastic material from which containers or other hollow articles are formed by a subsequent blowing operation.

In fabrication of thermoplastic containers, it is conventional to expand an extruded tube of thermoplastic material in a mold cavity of the desired contour. It is desirable that the finished containers have wall portions of substantially uniform wall thickness or, in the case of large containers, that the bottom portions of the container have heavier walls than the top portions. It can easily be seen that if the wall thickness of the extruded tubing from which the container is blown is substantially uniform, a container which is fabricated from such tubing will not have uniform wall thickness but rather will have thin shoulder and bottom portions and needlessly thick neck portions. The problem is more acute when the cross sectional contour of the container varies appreciably from top to bottom.

Therefore, it is an object of this invention to provide an improved apparatus for producing extruded thermoplastic tubing having variable wall thickness along the length thereof.

Another object of this invention is to provide an improved apparatus for producing extruded thermoplastic tubing whose inside and/or outside diameter can be either increased or diminished during the extrusion process resulting in tubing having variable wall thickness along the length thereof.

A further object of this invention is the provision of an apparatus whereby extruded lengths of tubing will vary in wall thickness in preselected axially spaced apart annular zones in such fashion that hollow articles subsequently blown from such tubing will have a desired wall thickness distribution.

Another important object of this invention is the provision of a novel extrusion orifice having at least one of the elements defining said orifice formed of a coil whose diameter may be varied during the extrusion process in order that tubular parisons issuing from said orifice may have variable wall thickness along the length thereof.

Other objects and a fuller understanding of the invention may be had by referring to the following description and claims, taken in conjunction with the accompanying drawings in which:

FIG. 1 is a front elevational view partly in section of the extrusion apparatus required to carry out the method of this invention, showing the annular orifice of such apparatus in position of maximum size;

FIG. 2 is a cross sectional view taken along line 2—2 of FIG. 1;

FIG. 3 is a view similar to FIG. 1 showing the elements of the apparatus in such a position as to define a smaller annular orifice;

FIG. 4 is a cross sectional view taken along line 4—4 of FIG. 3;

FIG. 5 is a front elevational view partly in section showing a modification of the apparatus wherein the outside diameter of the annular orifice remains constant and the inside diameter is varied;

FIG. 6 is a bottom view of the modified apparatus shown in FIG. 5;

FIG. 7 is a front elevational view partly in section of another modification of the apparatus wherein the outside diameter of the annular orifice is determined by a thin strip of metal rolled into a coil while the inside diameter is determined by a mandrel with a fixed diameter; and FIG. 8 is a view partly in section taken along line 8—8 of FIG. 7.

Referring to FIG. 1, the apparatus comprises a die block 10 provided with an inlet passage 11 at one side through which plasticized molding material M is introduced under pressure from an extruder (not shown) into longitudinal channel 12. A mandrel 16 is centrally positioned in channel 12. A helical coil 13 made from tightly wound resilient wire of rectangular cross-section surrounds mandrel 16 to define an annular channel 12a which communicates with longitudinal channel 12. The helical coil 13 cooperates with mandrel 16 to define an annular orifice 21 through which the plasticized molding material M issues in the form of tubing 29.

A gear 15 is mounted at the orifice end 17 of helical coil 13. One end 25 of the helical coil 13 is secured to the die block 10 while the orifice end 17 is provided with a radially projecting tooth which engages a slot 14 in gear 15. A rack 26, powered by a source not shown, engages gear 15 causing it and the orifice end 17 of helical coil 13 to rotate at predetermined intervals and directions. Any preferred form of reciprocating motor (not shown) may be employed in effecting the desired sequential operation of the rack 26. Rotation of the gear 15 in the direction of wind causes the helical coil 13 to tighten thereby reducing its effective diameter. Conversely, opposite rotation of gear 15 loosens helical coil 13 thereby increasing its effective diameter.

The rectangular wire forming the helical coil 13 has a variable cross-sectional area which is relatively large at the end 25 which is secured to die block 10 and becomes proportionately smaller as it approaches the orifice end 17. The purpose of the variable cross-section is to insure that as the helical coil 13 is tightened or loosened it will have its greatest change of diameter at end 17 which determines the outside diameter of orifice 21 and will have substantially no change of diameter at end 25 which is secured to die block 10, thereby insuring a tight seal between helical coil 13 and die block 10.

The mandrel 16 is a solid shaft of suitable material, such as steel, whose function is to determine the inside diameter of the annular orifice 21. Therefore, it can easily be seen that the inside diameter of the annular orifice 21 which is determined by the mandrel 16 remains fixed while the outside diameter of the annular orifice 21 which is determined by the inside surface of the helical coil 13 may be varied by rotating gear 15.

The helical coil 13 has a shoulder 19 provided at orifice end 17. A retaining plate 18 engages shoulder 19 thereby supporting helical coil 13 while also supporting gear 15. The gear 15 and the helical coil 13 may be fabricated from a material, such as brass for example, which will slide freely over the retaining plate. However, it must be understood that the invention is not limited to such material as the apparatus of this invention could easily be fitted with a bearing to permit gear 15 and the shoulder 19 of helical coil 13 to rotate freely over retaining plate 18. Also, this invention is not limited to a metallic helical coil as other types of resilient, heat resistant materials may suffice. An annular groove 27 is provided in gear 15 and is engaged by a corresponding annular rib 28 on retaining plate 18 which cooperate to maintain the axis of rotation of gear 15 in a fixed position.

The retaining plate 18 is secured by means of vertical rods 20 to a horizontal plate 22 positioned above die block 10. The mandrel 16 is also secured to horizontal plate 22 thereby insuring that the orifice end 17 of the helical coil 13 is always flush with the free end of the mandrel 16.

The horizontal plate 22 is supported above die block 10 by means of compression springs 23. The compression springs 23 serve a dual function of maintaining the turns of coil 13 in close contact to prevent leakage of plasticized molding material M while also compensating for the change in length as helical coil 13 is tightened or loosened. Vertical rods 24 are rigidly secured to die block 10 and are maintained in a slidable relationship with horizontal plate 22 to insure proper positioning of the assembly attached to plate 22 with relation to die block 10.

Thus, in operation, plasticized molding material M is forced from an extruder (not shown) through inlet 11 to longitudinal channel 12 and thence to annular channel 12a. As the plasticized molding material M issues through annular orifice 21 from annular channel 12a, the apparatus may, by way of example, initially have the helical coil 13 in a tightened position thereby defining a small annular orifice 21 (FIGS. 3 and 4) to form a comparatively thin walled section of extruded tubing to be used for the neck portion of a bottle; then by rotation of gear 15 the helical coil 13 may be loosened thereby defining a large orifice (FIGS. 1 and 2) to form a comparatively thick walled section of extruded tubing to be used for the shoulder portion of the bottle; then by rotating gear 15 in the opposite direction, the helical coil 13 may be tightened to an intermediate position thereby defining an annular orifice larger than that shown in FIGS. 3 and 4 but smaller than that shown in FIGS. 1 and 2 to form a section of extruded tubing having wall thickness suitable for the main body of the bottle; then by further rotation of gear 15 the helical coil 13 may be expanded to define a larger annular orifice to form a comparatively heavy walled section of extruded tubing to be used for the bottom of the bottle, thus completing one cycle.

Referring to FIGS. 5 and 6 there is shown a modification of this invention comprising a die block 49 provided with an inlet 41 at one side through which plasticized molding material M is introduced under pressure from an extruder (not shown) into a longitudinal channel 48. A mandrel 33 is centrally positioned in channel 48. A tightly wound helical coil 47 surrounds mandrel 33 and cooperates with the interior peripheral surface 40 of channel 48 to define an annular orifice 31 through which plasticized molding material M issues in the form of tubing 39.

A body 30 rests on one end 50 of helical coil 47 and is secured to die block 49 by means of tension springs 38. The end 50 of helical coil 47 is rigidly secured to body 30 while the orifice end has a tooth 52 which engages a slot 32 of mandrel 33. A gear 34 is secured to mandrel 33. A rack 35, powered by a source not shown, engages gear 34 causing it and mandrel 33 to rotate at predetermined intervals and directions. As mandrel 33 is rotated the helical coil 47 is either tightened or loosened depending upon the direction of rotation. This tightening or loosening of the coil results in varying the inside diameter of the annular orifice 31, while the outside diameter remains fixed. Any preferred form of reciprocating motor (not shown) may be employed in effecting the desired sequential operation of the rack 35.

A flange 36 of mandrel 33 engages a shoulder 37 of helical coil 47 to support the helical coil 47. The tension springs 38 force body 30 firmly onto end 50 of helical coil 47 and serve to maintain the coils in close contact and to compensate for the change of length of the helical coil 47 caused by tightening or loosening.

Referring to FIGS. 7 and 8 there is shown another modification of this invention comprising a die block 60 provided with an inlet 72 at one side through which plasticized molding material M is introduced under pressure from an extruder (not shown) into a longitudinal channel 61. A mandrel 62 is centrally positioned in channel 61.

A thin strip of metal rolled into a coil 63 defines an annular channel 61a which communicates with longitudinal channel 61. Coil 63 cooperates with mandrel 62 to define an annular orifice 71 through which the plasticized molding material M issues in the form of tubing.

A gear 64 surrounds coil 63 and has the outer end of coil 63 secured to it. A rack 65 powered by a source not shown engages gear 64 causing it to rotate at predetermined intervals and directions.

A retaining plate 66 is secured to die block 60 to hold the gear 64 in place. The gear 64 is provided with shoulders 74 and 75 which abut corresponding shoulders 76 and 77 of the retaining plate 66 and the die block 60 respectively, thereby maintaining the axis of rotation of gear 64 in a fixed position.

Straps 68 and 73 of substantial rigidity formed integral with the inner end of coil 63 engage respectively a slot 79 of die block 60 and slots 80 of retaining plate 66 to prevent rotational movement of the inner end of coil 63 while permitting the slight amount of radial movement required by tightening or loosening the coil.

Thus as the gear 64 is rotated by the rack 65, the coil 63 is either tightened or loosened depending upon the direction of rotation of the gear 64. Tightening of the coil 63 results in a smaller outside diameter of the annular orifice 71 while loosening results in a larger outside diameter. The inside diameter of annular orifice 71 which is determined by mandrel 62 remains fixed.

The operation of the modifications shown in FIGS. 5 through 8 is essentially like that discussed previously for FIGS. 1 through 4.

With any modification of this invention the wall thickness of the extruded tubing can be varied as desired during the extrusion and thus provide a tubular parison having a wall thickness distribution tailored to the requirements of the resulting blown plastic article.

Other modifications may be resorted to within the spirit and scope of the appended claims.

I claim:

1. A thermoplastic extrusion device comprising a die block having a passage adapted for flow of plasticized molding material therethrough, a mandrel element disposed in said passage, an annular element surrounding said mandrel element and cooperating therewith to define an annular orifice communicating with said passage, at least one of said elements comprising a resilient member formed as a coil, and means for variably twisting said coil to thereby vary the width of said annular orifice.

2. The combination defined in claim 1 wherein said member comprises a wire having a rectangular cross-section.

3. The combination defined in claim 1 wherein said member comprises a metallic band.

4. A thermoplastic extrusion device comprising a die block defining an open-end passage adapted for flow of plasticized molding material therethrough, a mandrel disposed in said passage, a helical coil made from tightly wound resilient wire of rectangular cross-section surrounding said mandrel and cooperating therewith to define an annular orifice, and means for variably twisting said helical coil to vary the effective width of said orifice.

5. The combination defined in claim 4 wherein said means for variably twisting said helical coil comprises a gear having a slot, said gear surrounding said coil, a tooth projecting from said coil, said tooth engaging said slot in said gear and means for variably rotating said gear.

6. A thermoplastic extrusion device comprising a die block defining an open-end passage adapted for flow of plasticized molding material therethrough, a helical coil made from tightly wound resilient wire of rectangular cross-section disposed in said passage and cooperating with the wall of said passage to define an annular orifice, and means for variably twisting said coil to vary the effective width of said orifice.

7. A thermoplastic extrusion device comprising a die block defining an open-end passage adapted for flow of plasticized molding material therethrough, a mandrel disposed in said passage, a helical coil made from tightly wound resilient wire of rectangular cross-section surrounding said mandrel and cooperating with the wall of said passage to define an annular orifice, and means for variably twisting said coil to vary the effective width of said orifice.

8. The combination defined in claim 7 wherein said means for variably twisting said helical coil comprises a tooth projecting from said coil, said tooth engaging a corresponding slot in said mandrel and means for variably rotating said mandrel.

9. A thermoplastic extrusion device comprising a die block defining an open-end passage adapted for flow of plasticized molding material therethrough, a mandrel disposed in said passage, a thin strip of metal rolled into a spiral coil surrounding said mandrel and cooperating therewith to define an annular orifice, and means for variably tightening or loosening said coil to vary the effective width of said orifice.

10. The combination defined in claim 9 wherein said means for variably tightening or loosening said spiral coil comprises a gear surrounding said coil, means for securing one end of said coil to said gear, means for preventing rotation of the other end of said coil, and means for variably rotating said gear.

11. An extruder orifice comprising an element defining one wall of an annular passageway, a coiled resilient member defining the other wall of said annular passageway, and means for variably twisting said coiled member to vary the width of said passageway.

12. The combination defined in claim 11 wherein said coiled member comprises a wire having a rectangular cross section.

13. The combination defined in claim 11 wherein said coiled member comprises a metallic band.

14. An annular extrusion passageway comprising a mandrel, a helical coil made from tightly wound resilient wire of rectangular cross-section surrounding said mandrel and cooperating therewith to define said passageway, and means for variably twisting said coil to vary the width of said passageway.

15. An annular extrusion passageway comprising a mandrel, a thin strip of resilient material rolled into a spiral coil surrounding said mandrel and cooperating therewith to define said passageway, and means for variably tightening or loosening said coil to vary the width of said passageway.

References Cited in the file of this patent

UNITED STATES PATENTS

| | | |
|---|---|---|
| 2,043,683 | Walter | June 9, 1936 |
| 2,044,961 | Waner | June 23, 1936 |
| 2,289,787 | Kaschke et al. | July 14, 1942 |
| 2,425,237 | Field | Aug. 5, 1947 |
| 2,434,835 | Colley | Jan. 20, 1948 |
| 2,632,202 | Haines | Mar. 24, 1953 |
| 2,712,693 | Comparette | July 12, 1955 |
| 2,750,625 | Colombo | June 19, 1956 |
| 2,780,835 | Sherman | Feb. 12, 1957 |
| 2,844,845 | Krall | July 29, 1958 |
| 3,019,481 | Negoro | Feb. 6, 1962 |